United States Patent
Yukizaki et al.

(10) Patent No.: US 10,812,953 B2
(45) Date of Patent: Oct. 20, 2020

(54) COMMUNICATION CONTROL DEVICE

(71) Applicant: DENSO CORPORATION, Kariya, Aichi-pref. (JP)

(72) Inventors: Yasumune Yukizaki, Kariya (JP); Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 69 days.

(21) Appl. No.: 16/085,003

(22) PCT Filed: Feb. 22, 2017

(86) PCT No.: PCT/JP2017/006452
§ 371 (c)(1),
(2) Date: Sep. 14, 2018

(87) PCT Pub. No.: WO2017/159239
PCT Pub. Date: Sep. 21, 2017

(65) Prior Publication Data
US 2019/0082314 A1    Mar. 14, 2019

(30) Foreign Application Priority Data
Mar. 18, 2016   (JP) .................... 2016-055974

(51) Int. Cl.
*H04W 4/46*   (2018.01)
*G08G 1/09*   (2006.01)
(Continued)

(52) U.S. Cl.
CPC ............. *H04W 4/46* (2018.02); *G08G 1/09* (2013.01); *G08G 1/16* (2013.01); *G08G 1/163* (2013.01);
(Continued)

(58) Field of Classification Search
CPC ... H04L 29/08945–08972; H04L 47/00; H04L 47/10; H04L 47/14; H04L 47/25;
(Continued)

(56) References Cited

U.S. PATENT DOCUMENTS 6,788,964 B1   9/2004 Satomura et al.
10,217,357 B1 *  2/2019 Elsheemy ............ G08G 1/0967
(Continued)

FOREIGN PATENT DOCUMENTS

JP   2000311294 A   11/2000
JP   2009118061 A    5/2009
(Continued)

*Primary Examiner* — Brendan Y Higa
(74) *Attorney, Agent, or Firm* — Harness, Dickey & Pierce, P.L.C.

(57) ABSTRACT

A vehicular communication control device includes: a communication packet generator generating a vehicle information packet indicating a vehicle traveling state; a transmission processor transmitting the vehicle information packet to a peripheral vehicle in a predetermined transmission cycle; a road information acquisition unit acquiring forward road information including a road connection point position at which a host vehicle traveling road is connected to another road; and a positional relationship determination unit determining, based on the forward road information, whether a remaining distance to the road connection point is equal to or smaller than a predetermined cycle change distance. The transmission processor: sets a predetermined first cycle as the transmission cycle when the remaining distance is larger than the predetermined cycle change distance; and sets a second cycle shorter than the first cycle as the transmission cycle when the remaining distance is equal to or smaller than the cycle change distance.

7 Claims, 4 Drawing Sheets

(51) Int. Cl.
  *G08G 1/16*    (2006.01)
  *H04W 28/02*   (2009.01)
  *H04L 12/825*  (2013.01)
  *H04L 12/801*  (2013.01)
  *H04W 72/12*   (2009.01)

(52) U.S. Cl.
  CPC .............. *H04L 47/14* (2013.01); *H04L 47/25* (2013.01); *H04W 28/021* (2013.01); *H04W 28/0226* (2013.01); *H04W 72/1226* (2013.01)

(58) Field of Classification Search
  CPC ... H04L 47/80–806; H04L 67/32–327; H04W 4/44–48; H04W 28/00; H04W 28/0226; H04W 28/0231; H04W 74/0808–0858; H04W 28/021; G08G 1/09–092; G08G 1/16–166; G08G 1/20
  See application file for complete search history.

(56) References Cited

U.S. PATENT DOCUMENTS

| | | | |
|---|---|---|---|
| 10,375,545 B2 * | 8/2019 | Yukizaki | H04W 4/48 |
| 2012/0323476 A1 | 12/2012 | Funabashi | |
| 2015/0029039 A1 * | 1/2015 | Mukaiyama | G08G 1/096716 340/905 |
| 2015/0348412 A1 * | 12/2015 | Onishi | G08G 1/096791 340/905 |
| 2016/0247330 A1 * | 8/2016 | Rork | H04W 4/021 |
| 2017/0263125 A1 * | 9/2017 | Tanabe | G08G 1/161 |
| 2017/0349176 A1 * | 12/2017 | Alden | B60W 60/0023 |

FOREIGN PATENT DOCUMENTS

| | | |
|---|---|---|
| JP | 2013005186 A | 1/2013 |
| JP | 2015228047 A | 12/2015 |
| WO | WO-2017159240 A1 | 9/2017 |
| WO | WO-2017159241 A1 | 9/2017 |
| WO | WO-2017159242 A1 | 9/2017 |

* cited by examiner

COMMUNICATION CONTROL DEVICE

CROSS REFERENCE TO RELATED APPLICATIONS

This application is a U.S. National Phase Application under 35 U.S.C. 371 of International Application No. PCT/JP2017/006452 filed on Feb. 22, 2017 and published in Japanese as WO/2017/159239 A1 on Sep. 21, 2017. This application is based on and claims the benefit of priority from Japanese Patent Application No. 2016-055974 filed on Mar. 18, 2016. The entire disclosures of all of the above applications are incorporated herein by reference.

TECHNICAL FIELD

The present disclosure relates to a communication control device that controls operation of a communication module for performing a vehicle-to-vehicle communication.

BACKGROUND ART

In recent years, a vehicle-to-vehicle communication system has been proposed in which each of multiple vehicles sequentially broadcasts a communication packet (hereinafter referred to as a vehicle information packet) indicating vehicle information such as a current position, a traveling speed, or a traveling direction, and sequentially receives a vehicle information packet transmitted from another vehicle.

As a mode of a communication between vehicles (that is, vehicle-to-vehicle communication) in the vehicle-to-vehicle communication system described above, as disclosed in Patent Literature 1, a mode of directly transmitting and receiving the vehicle information packet between the vehicles over no wide area communication network has been assumed. The direct wireless communication between the vehicles is realized by employing a CSMA/CA (carrier sense multiple access/collision avoidance) method as an access control method.

PRIOR ART LITERATURES

Patent Literature

Patent Literature 1: JP-2013-5186-A

SUMMARY

As a mode of realizing the vehicle-to-vehicle communication, a mode of transmitting and receiving the vehicle information packet between the vehicles over the wide area communication network is also conceivable. However, when the vehicles communicate with each other over the wide area communication network, there are a demand for reducing a transmission frequency of the vehicle information packet in order to reduce a communication traffic, and a demand for shortening a transmission interval of the vehicle information packet in order to share real-time vehicle information with the respective vehicles, and those demands are contradictory to each other.

It is an object of the present disclosure to provide a communication control device used in a vehicle-to-vehicle communication system that provides a vehicle-to-vehicle communication over a wide area communication network, which is capable of reducing a communication traffic while sharing vehicle information in real time.

According to an aspect of the present disclosure, a communication control device for a vehicle, controlling a wireless communication with a peripheral vehicle disposed around the vehicle via a wide area communication network, the communication control device includes: a communication packet generator that generates a vehicle information packet, which is a communication packet indicating a traveling state of the vehicle, based on a detection result of a sensor mounted on the vehicle; a transmission processor that performs a process for transmitting the vehicle information packet generated by the communication packet generation unit to the peripheral vehicle in a predetermined transmission cycle; a road information acquisition unit that acquires forward road information including a position of a road connection point at which a host vehicle traveling road, on which the vehicle travels, is connected to another road; and a positional relationship determination unit that determines, based on the forward road information acquired by the road information acquisition unit, whether a remaining distance to the road connection point, to which the vehicle is to go, is equal to or smaller than a predetermined cycle change distance. The transmission processing unit sets a predetermined first cycle as the transmission cycle when the positional relationship determination unit determines that the remaining distance to the road connection point is larger than the predetermined cycle change distance. The transmission processing unit sets a second cycle shorter than the first cycle as the transmission cycle when the positional relationship determination unit determines that the remaining distance to the road connection point is equal to or smaller than the predetermined cycle change distance.

In the present disclosure, the road connection point is a point at which one road and another road are connected to each other, specifically, an intersection, a merging point to a main road of an expressway or the like. Generally, when traveling in an area far from the road connection point, a usefulness of the vehicle information on the other vehicles is relatively lower than that when traveling in the vicinity of the road connection point. This is because a scene in which real-time vehicle information of another vehicle is required (in other words, useful) for driver's driving assistance, self-driving, or the like is often a case of traveling in the vicinity of the road connection point such as the intersection.

Under the above circumstances, in the configuration described above, when the remaining distance to the road connection point existing in front of the vehicle is larger than the predetermined cycle change distance, the transmission processing unit performs the process of sequentially transmitting the vehicle information packet in the relatively long first cycle. On the other hand, when the remaining distance is equal to or smaller than the cycle change distance, the transmission processing unit performs the process of sequentially transmitting the vehicle information packet in the relatively short second cycle.

Therefore, when the vehicle to which the communication control device described above is applied enters an area within the cycle change distance from the road connection point, the vehicle starts to transmit the vehicle information packet in a relatively short transmission cycle. In other words, in the vicinity of the road connection point, since each of applied vehicles transmits the vehicle information packet in the relatively short transmission cycle, real-time sharing of the vehicle information is realized.

On the other hand, in the area where the usefulness of the real-time vehicle information is relatively low, that is, in the area away from the road connection point, since the first cycle that is relatively long is employed as the transmission cycle, the communication traffic can be reduced. In other words, according to the configuration described above, the communication traffic can be reduced while sharing the vehicle information in real time.

BRIEF DESCRIPTION OF DRAWINGS

The above and other objects, features and advantages of the present disclosure will become more apparent from the following detailed description made with reference to the accompanying drawings. In the drawings.

EMBODIMENTS

Figure 1:
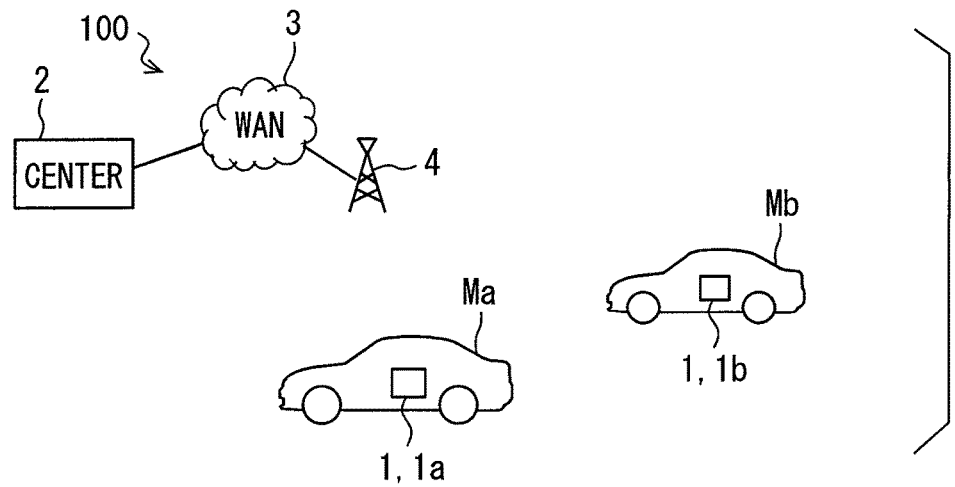
FIG. 1 is a block diagram illustrating an example of a schematic configuration of a vehicle-to-vehicle communication system.

Hereinafter, embodiments of the present disclosure will be described with reference to the accompanying drawings. FIG. 1 is a diagram illustrating an example of a schematic configuration of a vehicle-to-vehicle communication system 100 according to the present disclosure. As shown in FIG. 1, the vehicle-to-vehicle communication system 100 includes multiple vehicle systems 1 installed in respective multiple vehicles Ma and Mb, and a center 2.

In FIG. 1, for the sake of convenience, only two vehicles Ma and Mb are shown as vehicles (hereinafter referred to as applied vehicles) to which the respective vehicle systems 1 are applied, but even three or more vehicles may actually be present. Hereinafter, in the case of distinguishing the respective vehicle systems 1 installed in the vehicles Ma and Mb from each other, the vehicle system 1 installed in the vehicle Ma is referred to as a vehicle system 1a and the vehicle system 1 installed in the vehicle Mb is referred to as a vehicle system 1b.

<Overall Overview>

The vehicle-to-vehicle communication system 100 is configured to allow the applied vehicles to perform a wireless communication with each other over a wide area communication network 3. The applied vehicles travel on a road. The applied vehicles may include four-wheeled vehicles as well as two-wheeled vehicles, three-wheeled vehicles, or the like. The two-wheeled vehicles also include motorized bicycles. In the present embodiment, as an example, the applied vehicles Ma and Mb are four-wheeled vehicles.

Each of the applied vehicles is configured to be wirelessly connected to the wide area communication network 3 by the vehicle system 1 installed on the vehicle. The wide area communication network 3 in this example refers to a public communication network such as a cellular phone network or the Internet, which is provided by a telecommunications carrier. A base station 4 shown in FIG. 1 is a radio base station for the vehicle system 1 to connect to the wide area communication network 3. Hereinafter, for the sake of convenience, the communication over the wide area communication network 3 will be described briefly also as a wide area communication.

Each of the applied vehicles transmits a vehicle information packet indicating own vehicle information to the center 2 through the base station 4 and the wide area communication network 3 in a predetermined transmission cycle. In this example, the vehicle information packet is a communication packet indicating the vehicle information on the vehicle (that is, a transmission source vehicle) that has transmitted the vehicle information packet. The vehicle information includes a current position, a traveling direction, a traveling speed, an acceleration, and the like of the transmission source vehicle. In addition to the vehicle information, the vehicle information packet includes information such as a transmission time of the communication packet and transmission source information. The transmission source information is an identification number (so-called vehicle ID) assigned to the vehicle corresponding to the transmission source.

The center 2 has a function of transferring the vehicle information packet transmitted from one vehicle to another vehicle (that is, a peripheral vehicle) existing around the transmission source vehicle. An area around the transmission source vehicle is defined as range within a predetermined transfer vehicle-to-vehicle distance from the vehicle. In other words, the transfer vehicle-to-vehicle distance functions as a parameter used for extracting vehicles to which the received vehicle information packet is transferred from the various applied vehicles (in other words, a peripheral vehicle for the transmission source vehicle).

The transfer vehicle-to-vehicle distance may be maintained at a fixed value or may be dynamically determined according to the traveling speed of the transmission source vehicle or a type of the traveling road. In this case, as an example, it is assumed that the transfer vehicle-to-vehicle distance is set to a larger value as the traveling speed of the transmission source vehicle is higher. In another mode, the transfer vehicle-to-vehicle distance may be set to a value corresponding to the type of the road on which the transmission source vehicle is traveling. If the transfer vehicle-to-vehicle distance is set to a value corresponding to the type of the traveling road, the transfer vehicle-to-vehicle distance when the traveling road is an expressway is set to a relatively large value (for example, 400 m). On the other hand, the transfer vehicle-to-vehicle distance when the traveling road is a general road may be set to a value smaller than that when the traveling road is the expressway. The other vehicles existing within the transfer vehicle-to-vehicle distance from the transmission source vehicle correspond to peripheral vehicles for the transmission source vehicle.

The center 2 has a function of managing the current positions of the respective applied vehicles as a sub-function for determining a transfer destination of the received vehicle information packet. Management of the current position of each applied vehicle may be realized with the use of a database not shown. In the database, the current position of each applied vehicle is stored in association with the vehicle ID or the like. For convenience, data representing the current position of each applied vehicle is referred to as position management data. Each time the center 2 receives a vehicle information packet, the center 2 updates the current position of the transmission source vehicle registered in the database.

When receiving the vehicle information packet from a certain applied vehicle, the center 2 extracts the vehicles existing at a position within the transfer vehicle-to-vehicle distance at a straight line distance from the transmission source vehicle based on the position management data, and transfers the received vehicle information packet toward the extracted vehicle.

In this way, the vehicle-to-vehicle communication system 100 provides a vehicle-to-vehicle communication over the wide area communication network. Hereinafter, a configuration of the vehicle system 1 installed in each vehicle will be described in more detail.

<Configuration of Vehicle System 1>

In this case, a configuration of the vehicle system 1 will be described taking the vehicle system 1*a* installed in the applied vehicle Ma as an example. The same configuration is applied to the vehicle systems 1 installed in other applied vehicles (for example, the vehicle Mb). For the sake of convenience, the vehicle in which the subject vehicle system 1 is installed (that is, the vehicle Ma) is also described as a host vehicle, distinguishing from the vehicles in which other the vehicle systems 1 are installed.

Figure 2:
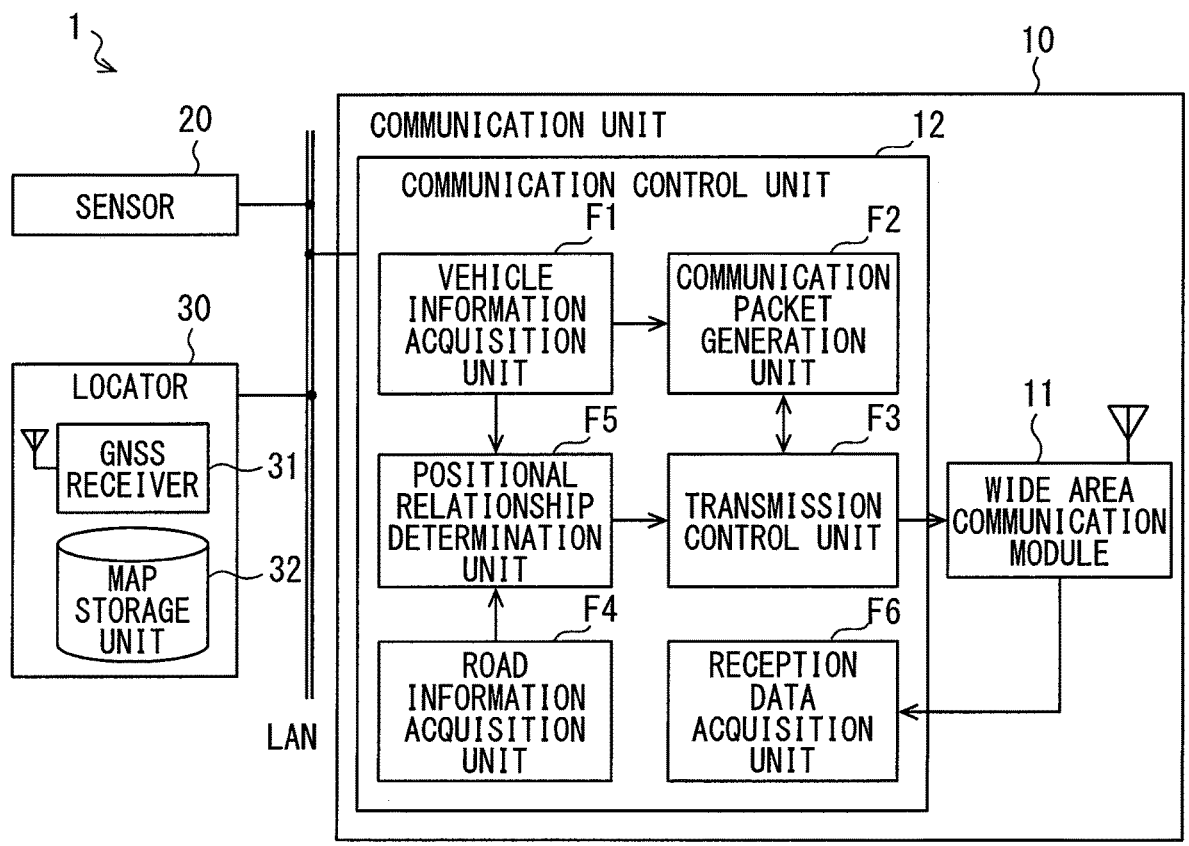
FIG. 2 is a block diagram illustrating an example of a schematic configuration of a vehicle system.

As shown in FIG. 2, the vehicle system 1 includes a communication unit 10, a sensor 20, and a locator 30. The communication unit 10 is connected to the sensor 20 and the locator 30 over a communication network (that is, LAN: local area network) built in the vehicle.

The communication unit 10 is configured to transmit and receive the vehicle information packet. The communication unit 10 generates the vehicle information packet based on the information provided from the sensor 20, and transmits the generated vehicle information packet to another vehicle (hereinafter referred to as a peripheral vehicle) existing around the host vehicle through the center 2. Further, the communication unit 10 receives the vehicle information packet transmitted from the peripheral vehicle through the center 2. Details of the communication unit 10 will be described later.

The sensor 20 is various sensors for detecting various state amounts relating to the traveling of the host vehicle. The state amounts relating to the travel of the host vehicle are, for example, a traveling speed, a yaw rate, a steering angle, an acceleration, a shift position, and the like. In other words, the sensor 20 includes a speed sensor that detects the traveling speed, a yaw rate sensor that detects the yaw rate, a steering angle sensor that detects the steering angle, an acceleration sensor that detects acceleration acting on the vehicle Ma, a shift position sensor, and the like. The current position of the host vehicle identified by the locator 30, which will be described later, is also included in the state amounts related to the traveling of the host vehicle.

The sensor 20 sequentially provides the communication unit 10 with a detection value of the state amount indicating the traveling state of the vehicle Ma over a LAN. The detection results of the various sensors 20 may be provided to the communication unit 10 through an ECU (electronic control unit) or the like. The sensors corresponding to the sensor 20 are not limited to those described above. Also, there is no need to have all of the sensors described above. The type of the sensor 20 may be appropriately designed.

The locator 30 is configured to identify a point where the host vehicle is currently traveling on a road map. The locator 30 includes a GNSS receiver 31 and a map storage unit 32 as finer components.

The GNSS receiver 31 receives a navigation signal transmitted by a navigation satellite provided in a GNSS (global navigation satellite system) which is a satellite navigation system, and sequentially calculates a current position based on the received navigation signal.

The map storage unit 32 stores road map data indicating road connection relationships and road shapes (in other words, road structures). The map storage unit 32 may be realized with the use of a nonvolatile storage medium such as a hard disk drive.

In another mode, the map storage unit 32 may be provided as a map database outside the vehicle. In that case, it is assumed that the vehicle system 1 is configured to be able to access the map database as the map storage unit 32 over the wide area communication network 3.

The road map data includes node data for each node and link data for each link. The node is a point appropriately set to represent the road connection relationship such as a connection point between the roads (hereinafter referred to as a road connection point) or a terminal end point of the road. The link is a road that connects between the roads. The road connection point is, for example, an intersection. The road connection point also includes a merging point, which is a point where an expressway main line and a ramp way are connected to each other. The ramp way is a road that connects the expressway and a general road.

A unique node ID is assigned to each node, and a unique link ID is assigned to each link. Various nodes and links for constructing a road network are identified by the node IDs and the link IDs.

The node data for a certain node includes a node ID, coordinate information indicating a position of the node, a node type, and information (for example, link ID) on a link connected to the node. The node type is information indicating a type as a road binding point, and is, for example, information indicating whether the node is an intersection, a merging point set on an expressway, or the like.

The link data includes a link ID, a link length, a link shape, a node ID corresponding to a beginning of the link, a node ID corresponding to a terminal of the link, a road width, lane information, a speed limit, and the like. In the present embodiment, as a more preferable mode, a road gradient is included in the link shape.

The locator 30 identifies the position of the host vehicle on the road map based on the current position detected by the GNSS receiver 31. Hereinafter, identifying the vehicle position on the road map is also referred to as mapping. Mapping of the vehicle position may be carried out by using a known map matching technique commonly used in navigation apparatuses. The map matching technique is a technique in which a traveling locus of the vehicle is obtained from the traveling direction and the traveling speed of the vehicle at multiple time points, and the traveling locus of the vehicle is compared with the road shape obtained from the map information to obtain the current position of the vehicle.

Further, the locator 30 sequentially identifies the road on which the host vehicle is traveling (hereinafter referred to as "host vehicle traveling road") based on the mapping result for the host vehicle. Then, the locator 30 provides the road map information (hereinafter referred to as "forward road information") relating to the identified host vehicle traveling road to the communication unit 10.

The forward road information may include a position of the road connection point existing in the traveling direction (in other words, the forward) of the host vehicle, a remaining distance Drmn to the road connection point (hereinafter referred to as the nearest connection point) existing at a position closest to the host vehicle among the road connection points existing in front of the host vehicle, and information (hereinafter referred to as road shape information) indicating the road shape of the host vehicle traveling road. It is preferable that the road shape information includes a gradient and a curvature of the road. For example, the locator 30 may provide the link data corresponding to the host vehicle traveling road as the road shape information.

In addition to the forward road information described above, the locator 30 also sequentially provides position information indicating the current position identified by the GNSS receiver 31 to the communication unit 10.

Since the passed road connection point does not correspond to the nearest connection point, when the locator 30 detects that the host vehicle has passed through the point treated by the host vehicle as the nearest connecting point, a next road connection point is set to the nearest connection point. The locator 30 may have the functions described above, and when the navigation device is installed in the host vehicle, the navigation apparatus may be used as the locator 30.

<Configuration of Communication Unit 10>

Next, the communication unit 10 will be described. The communication unit 10 includes a wide area communication module 11 and a communication control unit 12. The communication control unit 12 corresponds to a communication control device.

The wide area communication module 11 is configured for wirelessly connecting to the wide area communication network 3 and allowing the vehicle system 1 to perform a wide area communication with other communication devices. The wide area communication module 11 includes a wide area communication antenna and a transmission and reception unit not shown as finer elements.

The wide area communication antenna is configured for transmitting and receiving radio waves of a predetermined frequency band used for the wide area communication. The transmission and reception unit demodulates a signal received by the wide area communication antenna to provide the demodulated signal to the communication control unit 12, and modulates data input from the communication control unit 12 to output the modulated data to the wide area communication antenna and wirelessly transmit the output data. The wide area communication module 11 functions as a communication module that outputs the received data to the communication control unit 12, modulates the data input from the communication control unit 12, and transmits the modulated data to an external device (for example, a center 2) in cooperation with the wide area communication antenna and the transmission and reception unit.

The communication control unit 12 controls the operation of the wide area communication module 11. The communication control unit 12 is configured as a computer including a CPU, a RAM, a ROM, an I/O, and a bus line that connects those components to each other. The ROM stores a program (hereinafter referred to as a communication control program) for causing a normal computer to function as the communication control unit 12, and the like.

The communication control program described above may be stored in a non-transitory tangible storage medium, and a specific storage medium is not limited to a ROM. For example, the communication control program may be stored in a flash memory. Execution of the communication control program by the CPU corresponds to execution of a method corresponding to the communication control program.

The communication control unit 12 provides various functions shown in FIG. 2 by causing the CPU to execute the above-described communication control program stored in the ROM. In other words, the communication control unit 12 includes, as functional blocks, a vehicle information acquisition unit F1, a communication packet generation unit F2, a road information acquisition unit F4, a positional relationship determination unit F5, a transmission control unit F3, and a reception data acquisition unit F6.

Incidentally, some or all of the functional blocks included in the communication control unit 12 may be implemented with the use of one or plural ICs or the like (in other words, as hardware). In addition, some or all of the functional blocks included in the communication control unit 12 may be realized by a combination of software execution by the CPU with hardware members.

The vehicle information acquisition unit F1 acquires various information (that is, vehicle information) indicating the traveling state of the host vehicle from the sensor 20 and the locator 30. Specifically, the vehicle information acquisition unit F1 acquires the current position, the traveling speed, the yaw rate, the traveling direction, and the like of the host vehicle. Various information acquired by the vehicle information acquisition unit F1 is stored in a RAM not shown for a certain period of time.

The communication packet generation unit F2 generates the vehicle information packet with the use of the vehicle information stored in the RAM. In the present embodiment, as an example, the communication packet generation unit F2 generates the vehicle information packet based on a request from the transmission control unit F3. In another mode, the communication packet generation unit F2 may generate the vehicle information packet in a predetermined generation cycle.

The transmission control unit F3 is a functional block for controlling a transmission interval of the vehicle information packet. The transmission control unit F3 includes a timer (hereinafter referred to as a transmission timer) for transmitting the vehicle information packet in a predetermined transmission cycle as a sub-function for controlling the transmission interval of the vehicle information packet.

The transmission timer is configured to measure an elapsed time since a last transmission of the vehicle information packet. A state in which a count value of the transmission timer has reached a value corresponding to the transmission cycle corresponds to a timer expiration state. The transmission timer is reset and restarted each time the vehicle information packet is transmitted.

The operation of the transmission control unit F3 and the communication packet generation unit F2 may be appropriately designed. In this case, as an example, it is assumed that the transmission control unit F3 and the communication packet generation unit F2 cooperate with each other as follows to transmit the vehicle information packet in a predetermined transmission cycle. In other words, when the transmission timer expires, the transmission control unit F3 requests the communication packet generation unit F2 to generate the vehicle information packet. Then, the transmission control unit F3 outputs the vehicle information packet generated by the communication packet generation unit F2 to the wide area communication module 11 and wirelessly transmits the vehicle information packet.

The transmission cycle per se corresponding to the transmission interval of the vehicle information packet is dynamically changed by the transmission control unit F3. In the present embodiment, a first cycle T1 and a second cycle T2 having different lengths are registered in the ROM in advance as setting values adoptable as the transmission cycle of the vehicle information packet. The transmission control unit F3 selects the values adoptable as the transmission cycles from the first cycle T1 and the second cycle T2 based on a determination result of the positional relationship determination unit F5 to be described later.

In this case, as an example, the first cycle T1 is set to 1 second and the second cycle T2 is set to 0.1 seconds. The first cycle T1 may be set to be longer than the second cycle T2. For example, the first cycle may be 0.5 seconds, 0.8 seconds, or the like. It is preferable that the first cycle T1 is set to a relatively long value from the viewpoint of reducing a communication traffic.

On the other hand, the second cycle T2 is a value to be adopted when real-time sharing of information is required. A value of about several hundred milliseconds is assumed as the transmission cycle of the vehicle information packet in the conventional vehicle-to-vehicle communication system. Therefore, it is preferable that the transmission cycle of the vehicle information packet is set to a relatively small value (for example, 300 milliseconds or less) from the viewpoint of real-time information sharing. The transmission control unit F3 corresponds to a transmission processing unit.

The first cycle T1 may be designed to a larger value (for example, 10000 seconds or more) as the transmission of the vehicle information packet is substantially not performed. In other words, the first cycle T1 may be set to a value treated as infinity by the transmission control unit F3. Further, the transmission control unit F3 may be configured not to transmit the vehicle information packet when the transmission cycle is set to the first cycle T1.

The road information acquisition unit F4 acquires the forward road information from the locator 30. The acquired forward road information is provided to the positional relationship determination unit F5. As described above, the forward road information includes the remaining distance Drmn to the nearest connection point and the like.

The positional relationship determination unit F5 determines whether the remaining distance Drmn to the nearest connection point included in the forward road information acquired by the road information acquisition unit F4 is equal to or less than a predetermined cycle change distance Dth, or not. In other words, the positional relationship determination unit F5 determines whether the host vehicle exists in a range within the cycle change distance Dth from the nearest connection point, or not.

The cycle change distance Dth is used for determining whether to set the transmission cycle T of the vehicle information packet to the second cycle T2 shorter than the predetermined first cycle T1, or not. The cycle change distance Dth may be a constant value previously designed or may be determined dynamically (in other words, adjusted) according to the traveling speed of the host vehicle.

In this case, as a more preferable mode, the positional relationship determination unit F5 sets the cycle change distance Dth to a larger value as the traveling speed of the host vehicle is higher. For example, when the traveling speed of the host vehicle is equal to or less than a cruising speed (for example, 50 km/h) of the general road, the positional relationship determination unit F5 sets the cycle change distance Dth to 200 m, and when the traveling speed is equivalent to the cruising speed of the expressway (for example, 80 km/h), the positional relationship determination unit F5 sets the cycle change distance Dth to 400 m or the like. A specific value of the cycle change distance Dth corresponding to the traveling speed may be appropriately designed.

The reception data acquisition unit F6 acquires data (for example, a vehicle information packet from another vehicle) received by the wide area communication module 11. The vehicle information packet acquired by the reception data acquisition unit F6 is stored in the RAM or the like separately for each vehicle and is provided to another electronic control unit (ECU: electronic control unit) over the LAN.

<Transmission Cycle Control Process>

Figure 3:
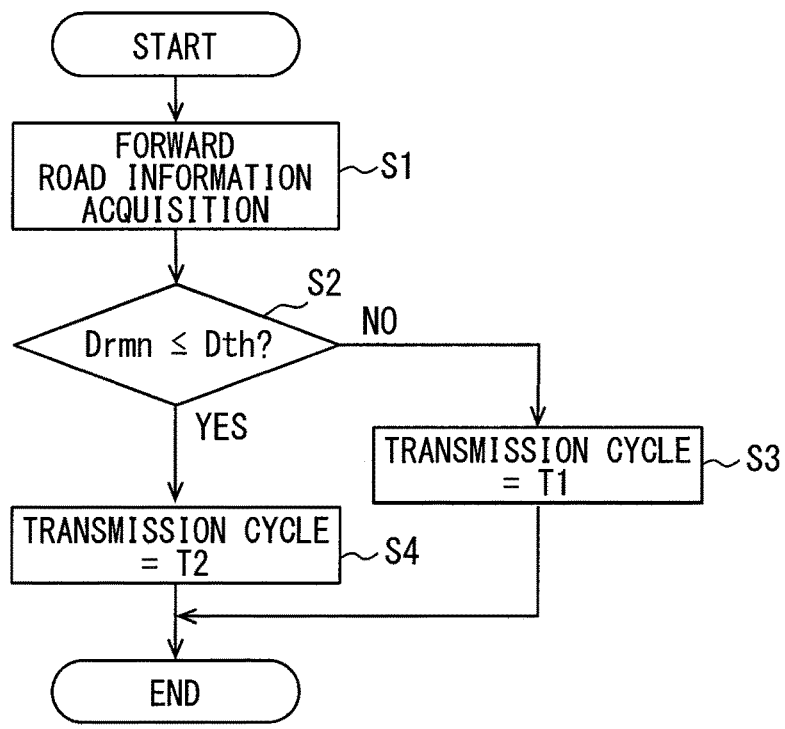
FIG. 3 is a flowchart illustrating a transmission cycle control process.

Next, a transmission cycle control process performed by the communication control unit 12 will be described with reference to a flowchart shown in FIG. 3. The transmission cycle control process controls the transmission cycle of the vehicle information packet. The transmission cycle control process may be started sequentially (for example, every 50 milliseconds) while a power supply (for example, an ignition power supply) of the vehicle is on.

First, in Step S1, the road information acquisition unit F4 acquires the forward road information provided from the locator 30 and the flow proceeds to Step S2. In Step S2, the positional relationship determination unit F5 determines whether the remaining distance Drmn to the nearest connection point is equal to or less than the cycle change distance Dth, or not. If the remaining distance Drmn to the nearest connection point is equal to or less than the cycle change distance Dth, an affirmative determination is made in Step S2 and the flow proceeds to Step S4. On the other hand, if the remaining distance Drmn to the nearest connection point is not equal to or less than the cycle change distance Dth, a negative determination is made in Step S2 and the flow proceeds to Step S3. It is assumed that the cycle change distance Dth is adjusted to a value corresponding to the current traveling speed of the host vehicle by the positional relationship determination unit F5.

In Step S3, the transmission control unit F3 sets the transmission cycle to the first cycle T1 and terminates the present flow. In Step S4, the transmission control unit F3 sets the transmission cycle to the second cycle T2 and completes the present flow.

Overview of Embodiment

With the above configuration, when the remaining distance Drmn to the nearest connection point is equal to or less than the cycle change distance Dth, the transmission cycle is set to the relatively short second cycle T2. Further, when the remaining distance Drmn to the nearest connection point is larger than the cycle change distance Dth, the transmission cycle is set to the relatively long first cycle T1.

In this case, a fact that the remaining distance Drmn to the nearest connection point is equal to or less than the cycle change distance Dth implies that the host vehicle will soon enter a point at which to join with another road such as an intersection (that is, a road connection point). A fact that the remaining distance Drmn to the nearest connection point is larger than the cycle change distance Dth implies that the host vehicle is traveling along the road at a point distant from the road connection point such as an intersection.

Therefore, according to the above configuration, the communication unit 10 transmits the vehicle information packet in a relatively long transmission cycle when the host vehicle is present in an area away from the intersection or the like. On the other hand, the communication unit 10 transmits the vehicle information packet in a relatively short transmission cycle when the host vehicle enters the intersection or the like shortly.

Lengthening the transmission cycle corresponds to a reduction in the transmission frequency (in other words, the communication traffic) of the vehicle information packet. Shortening the transmission cycle corresponds to an increase in the transmission frequency of the vehicle information packets and implementation of information transmission to other vehicles more densely.

Meanwhile, as a case where more real-time vehicle information on other vehicles is needed (in other words, useful) in assisting driving of a driver and self-driving the host vehicle, a case where the host vehicle enters an intersection or the like is assumed. Also, at a point away from the intersection or the like, the usefulness of the vehicle information on the other vehicles is relatively lower than that just before entering the intersection.

Therefore, the communication control unit 12 configured as described above controls the transmission cycle according to a positional relationship between the road connection point such as the intersection and the host vehicle so as to shorten the transmission interval in a situation where the necessity of sharing each vehicle information is relatively high, and to lengthen the transmission interval in a situation where the necessity of sharing the vehicle information is relatively low.

According to the mode described above, a demand for reducing the communication frequency for the purpose of a reduction in the communication traffic and a demand for sharing the real-time information with each other can be satisfied, respectively. In other words, with the use of the communication control unit 12 described above, the vehicle information packets can be transmitted in a more appropriate transmission cycle.

Figure 4:
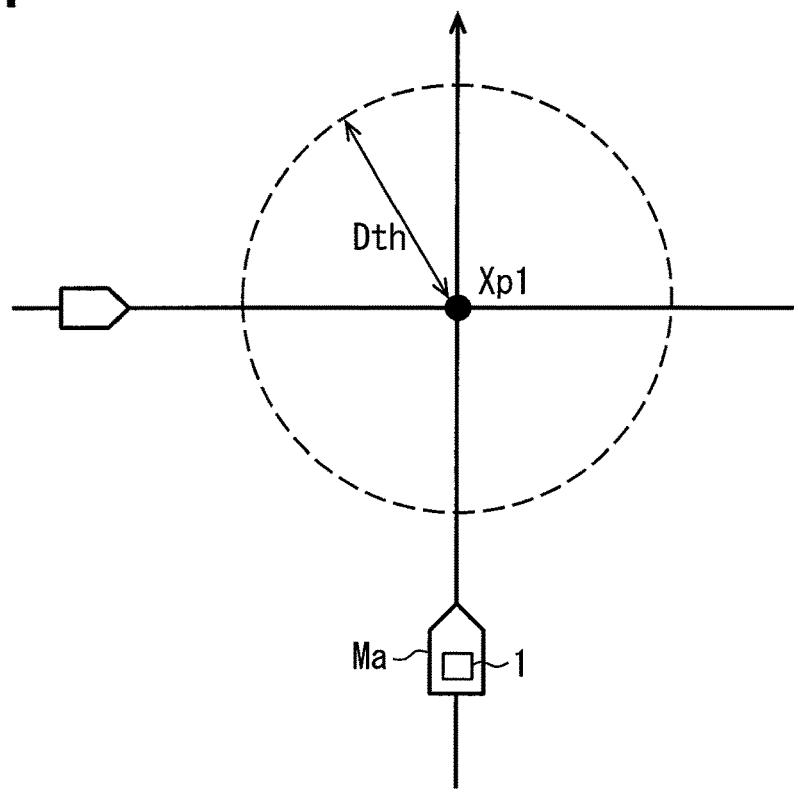
FIG. 4 is a diagram illustrating the operation of the present embodiment.
Figure 5:
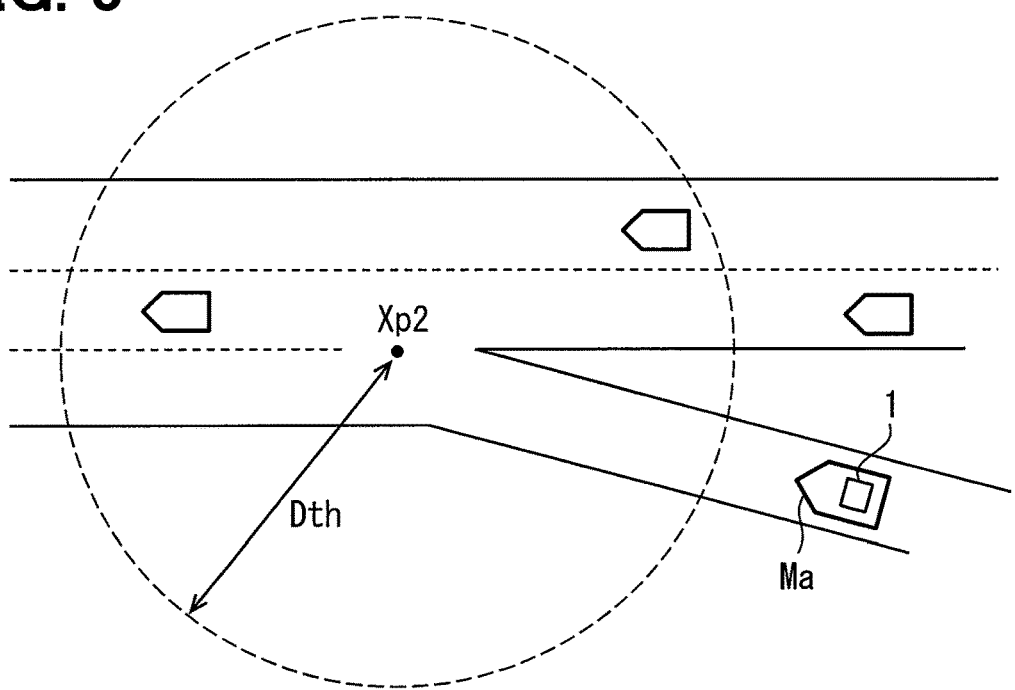
FIG. 5 is a diagram illustrating the operation of the present embodiment.

FIGS. 4 and 5 are diagrams illustrating the operation of the entire vehicle-to-vehicle communication system 100. Symbol Xp1 shown in FIG. 4 and Xp2 shown in FIG. 5 represent the positions of the nearest connection points, and each area surrounded by a broken line represents an area in which the distance from the nearest connection point is equal to or less than the cycle change distance Dth (hereinafter referred to as a connection point neighborhood area). The point Xp1 represents an intersection of a general road, and the point Xp2 represents a merging point to a main road of an expressway.

Since each of the applied vehicles has the function described above, an inside of the connection point neighborhood area functions as an area where the vehicle-to-vehicle communication is performed densely. On the other hand, an outside of the connection point neighborhood area functions as an area where the vehicle-to-vehicle communication is reduced.

Although the embodiments of the present disclosure have been described above, the present disclosure is not limited to the embodiments described above, and various modifications to be described below are also encompassed in a technical scope of the present disclosure. In addition, various modifications can be implemented in appropriate combination. Furthermore, various modifications other than the following examples can be made without departing from the spirit of the present disclosure. For example, the communication control unit 12 may include a part of the functions of the locator 30.

The members having the same functions as those in the members described in the above embodiment are denoted by the identical reference numerals, and a description of the same members will be omitted. Further, when referring to only a part of the configuration, the configuration of the embodiment described above can be applied to other portions.

[Modification 1]

The positional relationship determination unit F 5 may operate by adjusting the cycle change distance Dth according to weather and a road surface condition. The road surface condition in this example means whether the road surface is wet, snowing, frozen, or not, whether the road is paved, or not, or the like. The road surface condition may be represented by a friction coefficient of the road surface. Also, the weather in this example refers to rainfall, snowfall, presence or absence of fog, or the like. In any case, the positional relationship determination unit F5 corrects the cycle change distance Dth to a longer value as the road surface frictional force of the host vehicle traveling road is smaller, and operates the corrected position changing distance Dth.

This is because of the following reason. For example, when the road surface is wet, the friction coefficient between the tire and the road surface decreases, and a time required for adjusting the vehicle-to-vehicle distance or the like becomes longer. Also, during rainfall or snowfall, visibility of the surrounding environment by the driver decreases, and a series of driving operations such as recognition, determination and operation are likely to be delayed.

On the other hand, if the cycle change distance Dth is increased, the area where the second cycle T2 is adopted as the transmission cycle is expanded. In other words, real-time sharing of the vehicle information is realized in a wider range. For that reason, a time margin can be provided in executing the vehicle control based on the vehicle information of the other vehicles and the provision of information to the driver.

The information indicating the road surface condition may be acquired from the sensor 20 mounted on the vehicle or may be acquired from an external server or the like over the wide area communication network 3. A sensor that senses a state amount indicating the road surface condition includes, for example, a rain sensor that detects rainfall. Various techniques for detecting a frictional force between a tire and the road surface have also been proposed, and the road surface condition may be determined by employing those known techniques.

[Modification 2]

When a road gradient of the host vehicle traveling road can be acquired as the forward road information, the positional relationship determination unit F5 may adjust the cycle change distance Dth based on the road gradient of the host vehicle traveling road. Specifically, when the road has an upward slope, the cycle change distance Dth is decreased by a predetermined amount, and when the road has a downward slope, the cycle change distance Dth is increased by a predetermined amount. This is because a braking force of the vehicle changes according to the gradient, and accordingly the time required for adjustment of the vehicle-to-vehicle distance and the like also changes. Basically, the cycle change distance Dth may be set to be shorter in a situation where the traveling speed is more easily reduced. It should be noted that a specific adjustment amount may be appropriately designed.

[Modification 3]

In the embodiment described above, the mode in which the cycle change distance Dth is adjusted according to the traveling speed has been exemplified, but the present disclosure is not limited to the above configuration. The cycle change distance Dth may be determined according to a node type of the nearest connection point. The cycle change distance Dth is set to a relatively large value when the nearest connection point is a merging point to the main road of the expressway, and set to a relatively small value when the nearest connection point is an intersection of the general road.

In general, the traveling speed on a general road is not as large as that when traveling on an expressway. Therefore, even with such a mode, the cycle change distance can indirectly be set to a value corresponding to the traveling speed of the host vehicle or the peripheral vehicles. It is needless to say that the value of the cycle change distance Dth may be adjusted based on both of the traveling speed and the node type. How to adjust in that case may be designed as appropriate based on the above idea.

[Modification 4]

In the above description, the mode in which the transmission cycle is changed based on the remaining distance Drmn to the nearest connection point has been exemplified, but the present disclosure is not limited to the above configuration. For example, the communication control unit 12 may determine whether the peripheral vehicles are present, or not, and maintain the second cycle T2 as the transmission cycle when there are no peripheral vehicles even when there is the remaining distance Drmn to the nearest connection point. If there are no peripheral vehicles, the transmitted vehicle information packet is not used by the peripheral vehicles. For that reason, there is little need to shorten the transmission cycle.

Figure 6:
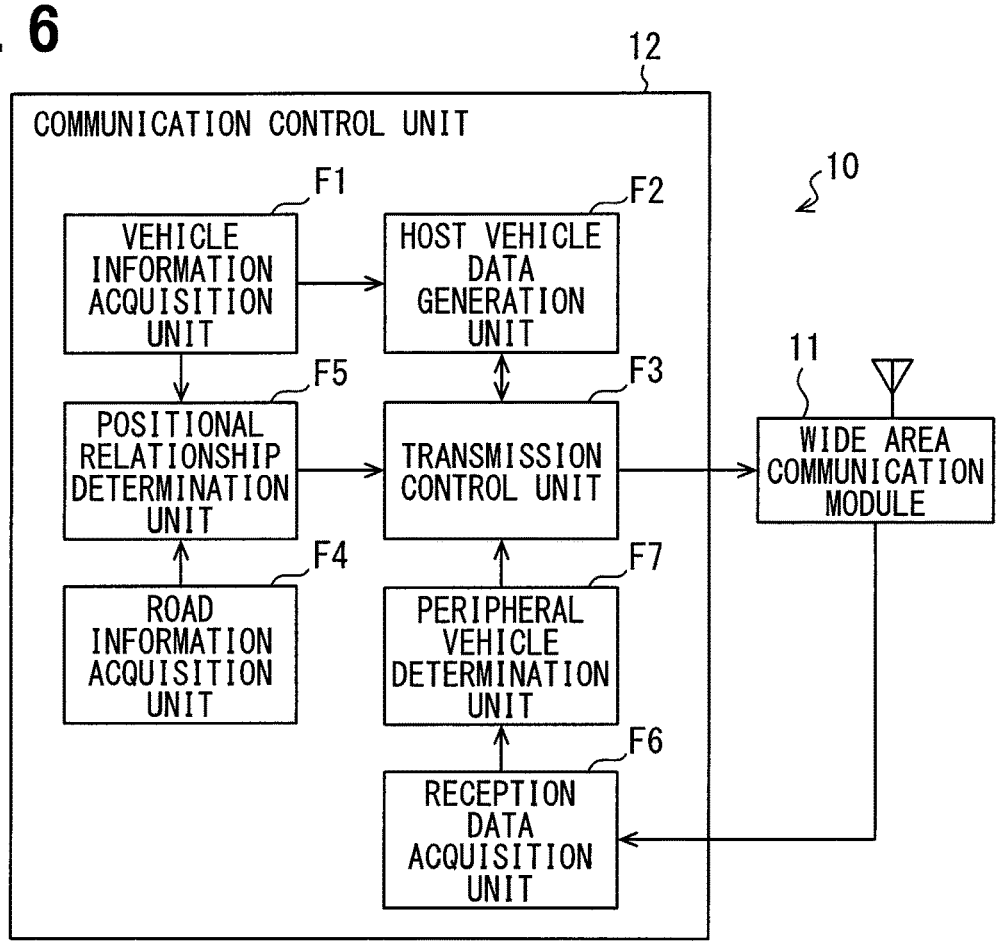
FIG. 6 is a block diagram illustrating a schematic configuration of a communication control unit according to Modification 4.

The Modification 4 may be realized by, for example, a configuration shown in FIG. 6. FIG. 6 is a functional block diagram schematically showing the functions of the communication control unit 12 according to Modification 4. The communication control unit 12 according to Modification 4 includes a peripheral vehicle determination unit F7 as a functional block in addition to the various functions described above.

The peripheral vehicle determination unit F7 is a functional block for determining whether there is a peripheral vehicle, or not. The presence or absence of the peripheral vehicle may be determined based on whether the vehicle information packet of another vehicle is being transferred from the center 2, or not. For example, when the peripheral vehicle determination unit F7 has not received the vehicle information packet of another vehicle within a determination time from the present time, the peripheral vehicle determination unit F7 determines that no peripheral vehicle is present. On the other hand, when the peripheral vehicle determination unit F7 has received the vehicle information packet of another vehicle within the determination time, the peripheral vehicle determination unit F7 determines that the peripheral vehicle is present.

The determination time may be appropriately designed. However, it is preferable that the determination time is longer than one time of the first cycle T1. For example, the determination time may be twice as long as the first cycle T1 or the like. Whether the vehicle information packet of another vehicle has been received within the determination time, or not, can be identified by referring to the RAM. This is because the vehicle information packets acquired by the reception data acquisition unit F6 are stored in the RAM.

When the positional relationship determination unit F5 determines that the remaining distance Drmn is equal to or shorter than the cycle change distance Dth and the peripheral vehicle determination unit F7 determines that the peripheral vehicle is present, the transmission control unit F3 according to Modification 4 sets the transmission cycle to the second cycle T2. On the other hand, when the positional relationship determination unit F5 determines that the remaining distance Drmn is not equal to or shorter than the cycle change distance Dth, and when the peripheral vehicle determination unit F7 determines that no peripheral vehicle is present, the transmission control unit F3 sets the transmission cycle to the first cycle T1.

According to the configuration described above, the communication traffic can be further reduced. In addition, since the second cycle T2 is adopted as the transmission cycle when the peripheral vehicle is present, a real time property of the vehicle-to-vehicle communication can be maintained.

[Modification 5]

In the embodiment described above, when passing through the point treated as the nearest connection point, the point to be set as the nearest connection point is updated to another point existing ahead of the host vehicle, and hence the transmission control unit F 3 operates to return the transmission cycle from the second cycle T2 to the first cycle T1 with the passage of the point that has been treated as the nearest connection point.

However, since the host vehicle is still present in the vicinity of the point Xp immediately after having passed through the road connection point, the vehicle information packet of the host vehicle may be still useful for the other vehicle that is about to pass through the point Xp.

Therefore, the transmission control unit F3 may maintain the transmission cycle as the second cycle T 2 until the host vehicle moves by a predetermined cycle return distance from the road connection point Xp even after having passed through the road connection point Xp. The cycle return distance may be appropriately designed, and may be set to the same value as the cycle change distance Dth.

Figure 7:
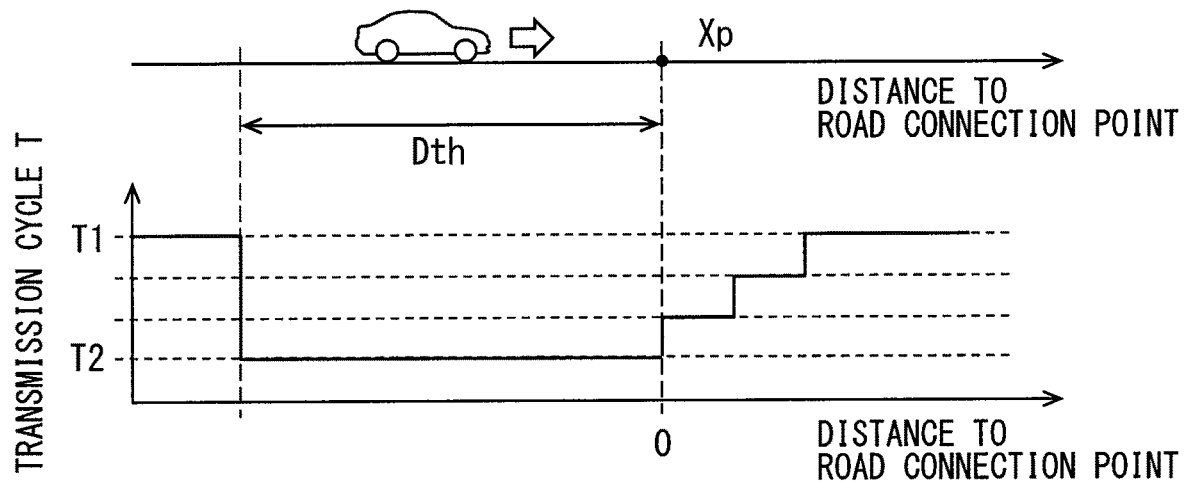
FIG. 7 is a diagram illustrating the operation of a transmission control unit according to Modification 5.

Further, when the transmission cycle is returned from the second cycle T2 to the first cycle T1, as shown in FIG. 7, the transmission control unit F3 may continuously or stepwise (that is, gradually) return the transmission cycle from the second cycle to the first cycle T1.

The case of returning from the second cycle T2 to the first cycle T1 represents a case where the host vehicle passes through the point Xp that has been treated as the nearest connection point. Since the host vehicle is still present in the vicinity of the point Xp immediately after having passed through the point Xp, the vehicle information packet of the host vehicle may be still useful for the other vehicle that is about to pass through the point Xp.

With the mode in which the transmission cycle gradually returns from the second cycle T2 to the first cycle T1, while the communication traffic is reduced, the vehicle information packet of the host vehicle that has passed the point Xp can be provided to the other vehicle that is going to pass through the point Xp at a relatively short interval.

It should be noted that the transmission cycle adopted in the process of returning the transmission cycle from the second cycle T2 to the first cycle T1 may be set to a value corresponding to a distance between the point Xp that has been treated as the nearest connection point and the host vehicle or an elapsed time since the host vehicle has passed through the point Xp. The transmission cycle is set to be closer to the first cycle T1 as the distance to the point Xp increases more or the elapsed time since passing through the point Xp is longer. The set value as the transmission cycle may be determined and updated at a timing of transmitting the vehicle information packet, in other words, at a timing of restarting the transmission timer.

[Modification 6]

In Modification 5, the mode in which the transmission cycle is gradually switched from the second cycle T2 to the first cycle T1 has been exemplified. Alternatively, the change from the first cycle T1 to the second cycle T2 may also be shifted in a stepwise fashion according to the remaining distance Drmn. In that case, the transmission cycle is set to be closer to the second cycle T2 as the remaining distance Drmn is smaller. A specific value of the transmission cycle corresponding to the remaining distance Drmn may be appropriately designed. However, when the remaining distance Drmn is equal to or shorter than the cycle change distance Dth, it is preferable that the transmission cycle starts to be shortened more than the first cycle from a stage where the remaining distance Drmn is larger than the cycle change distance Dth so that the transmission cycle becomes the second cycle T2.

[Modification 7]

In the embodiment described above, the road information acquisition unit F4 acquires the forward road information from the locator 30, but the present disclosure is not limited to the above configuration. When the vehicle system 1 is equipped with a vehicle camera for imaging a front of the vehicle, an image captured by the vehicle camera may be analyzed to detect an intersection or the like and identify the remaining distance to the detected intersection. In other words, a source device of the forward road information may be configured by the vehicle camera.

Since a technology for detecting a predetermined detection object from the image captured by the vehicle camera has been well known as an image recognition technology, a description of a specific detection implementation method will be omitted. The detection of the intersection or the like may be performed with the use of traffic signals, road signs or the like as markers. As another embodiment, the forward road information may be acquired with the use of an environment recognition based on the image captured by the vehicle camera and the locator 30 together.

[Modification 8]

When the condition for adopting the second cycle T2 (hereinafter referred to as a second cycle condition) is satisfied, the communication control unit 12 may generate and transmit a second cycle request packet for requesting the peripheral vehicles to adopt the second cycle T2 as the transmission cycle. The generation per se of the second cycle request packet may be performed by the communication packet generation unit F2. Whether the second cycle request packet is to be transmitted, or not, in order words, the second cycle condition is satisfied, or not, may be determined by the transmission control unit F3.

The case in which the second cycle condition is satisfied means a case where the remaining distance Drmn is equal to or shorter than the cycle change distance Dth in the embodiment. In Modification 4, such a case means a case in which the remaining distance Drmn is the cycle change distance Dth and there are the peripheral vehicles. The contents of the second cycle condition may be appropriately designed.

The second cycle request packet transmitted by the transmission control unit F3 in cooperation with the wide area communication module 11 is transferred to the peripheral vehicles by the center 2. Upon receiving the second cycle request packet from, for example, the vehicle Ma, the center 2 identifies the peripheral vehicles of the vehicle Ma and transfers the second cycle request packet to the identified peripheral vehicles. When each of the vehicle systems 1 receives the second cycle request packet, the vehicle system 1 adopts the second cycle T2 as the transmission cycle.

When the transmission cycle is set to the second period T2 with the reception of the second cycle request packet as a trigger, the transmission control unit F3 does not perform the transmission of the second cycle request packet. This is because if the second cycle request packet is transmitted even when the transmission cycle is set to the second cycle T2 with the reception of the second cycle request packet, the second cycle request packet is diffused in a chain.

According to the configuration disclosed as Modification 8, the vehicle information packet can be transmitted to the peripheral vehicles in the second cycle T2 as the host vehicle comes closer to the road connection point. Therefore, according to the configuration of Modification 8, the real-time sharing of the vehicle information can be more surely realized.

In addition, the transmission control unit F3 transmits over a wide area the communication packet (hereinafter referred to as a return permission packet) that permits the transmission cycle to return to the first cycle when the second cycle condition is no longer satisfied after having transmitted the second cycle request packet.

When receiving the second cycle request packet from the other vehicles, the transmission control unit F3 registers information (for example, vehicle ID) indicating the transmission source of the communication packet in the RAM or the like as a request source vehicle. When receiving the return permission packets from all of the request source vehicles, the transmission control unit F3 returns the transmission cycle from the second cycle T2 to the first cycle T1.

Incidentally, there is a high possibility that some of the transmission source vehicles of the second cycle request packets which could not thereafter receive the vehicle information packet are no longer the peripheral vehicles for the host vehicle. For that reason, the vehicles that can no longer receive the vehicle information packet may be deleted from registration as the request source vehicles.

[Modification 9]

Figure 8:
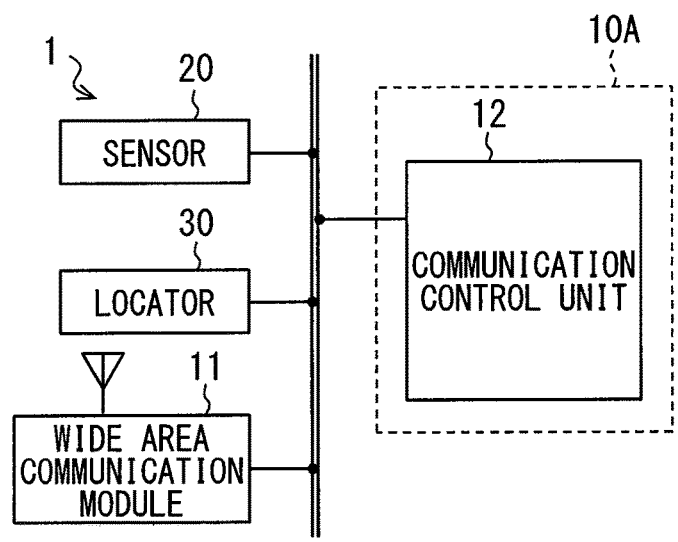
FIG. 8 is a block diagram illustrating a configuration of a vehicle system according to Modification 8.

In the above description, the mode in which the wide area communication module 11 and the communication control unit 12 are integrated together has been exemplified, but the present disclosure is not limited to the above configuration. As shown in FIG. 8, the wide area communication module 11 is provided outside the unit 10A including the communication control unit 12, and the wide area communication module 11 and the communication control unit 12 are configured to be connected to each other over a LAN.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication control device for a vehicle, controlling a wireless communication with a peripheral vehicle disposed around the vehicle via a wide area communication network, the communication control device comprising:
 a computer having a processor and configured to
  generate a vehicle information packet, which is a communication packet indicating a traveling state of the vehicle, based on a detection result of a sensor mounted on the vehicle;
  control transmitting the vehicle information packet to the peripheral vehicle in a predetermined transmission cycle;

acquire forward road information including a position of a road connection point that connects a host vehicle traveling road, on which the vehicle travels, to another road; and determine, based on the forward road information, whether a remaining distance to the road connection point, to which the vehicle travels, is equal to or smaller than a predetermined cycle change distance, wherein:

the computer is further configured to set a predetermined first cycle as the transmission cycle in response to determining that the remaining distance to the road connection point is larger than the predetermined cycle change distance;

set a second cycle shorter than the first cycle as the transmission cycle in response to determining that the remaining distance to the road connection point is equal to or smaller than the predetermined cycle change distance;

generate a second cycle request packet, which requests the peripheral vehicle to set the second cycle as the transmission period, in response to a second cycle condition for setting the transmission cycle to the second cycle being satisfied; and control transmitting the second cycle request packet.

2. The communication control device according to claim 1, wherein:

the computer is further configured to determine a value to be set as the cycle change distance based on at least one of a traveling speed of the vehicle and a type of the road connection point.

3. The communication control device according to claim 1, wherein:

the computer is further configured to determine whether another vehicle corresponding to the peripheral vehicle is disposed within a predetermined area from the vehicle, based on whether the vehicle information packet transmitted from the peripheral vehicle is received; and set the first cycle as the transmission cycle in response to determining that the peripheral vehicle is not disposed within the predetermined area even when determining that the remaining distance to the road connection point is equal to or smaller than the predetermined cycle change distance.

4. The communication control device according to claim 1, wherein:

in response to switching the transmission cycle from the second cycle to the first cycle in association with passing the road connection point, the computer is further configured to control the transmission cycle closer to the first cycle in a stepwise fashion according to a distance passed from the road connection point or an elapsed time from a passing time point.

5. The communication control device according to claim 1, wherein:

in response to receiving the second cycle request packet, the computer is further configured to set the transmission cycle to the second cycle.

6. The communication control device according to claim 5, wherein:

the computer is further configured to transmit a return permission packet, which is a communication packet that permits the transmission cycle to return to the first cycle, in response to the second cycle condition no longer being satisfied after transmitting the second cycle request packet.

7. The communication control device according to claim 6, wherein:

the computer is further configured to set the transmission cycle to the first cycle in response to receiving the return permission packet from all of vehicles corresponding to transmission sources of the second cycle request packet in a case where the transmission cycle is set to the second cycle based on reception of the second cycle request packet.

\* \* \* \* \*